(12) United States Patent
Li

(10) Patent No.: US 10,706,241 B2
(45) Date of Patent: Jul. 7, 2020

(54) METHOD FOR KEEPING ACTIVE STATE OF SMART CARD UNTIL RE-ENTERING FIELD, AND SMART CARD

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 134 days.

(21) Appl. No.: 16/069,876

(22) PCT Filed: Jan. 12, 2017

(86) PCT No.: PCT/CN2017/071007
§ 371 (c)(1),
(2) Date: Jul. 12, 2018

(87) PCT Pub. No.: WO2017/121359
PCT Pub. Date: Jul. 20, 2017

(65) Prior Publication Data
US 2019/0026508 A1  Jan. 24, 2019

(30) Foreign Application Priority Data

Jan. 13, 2016  (CN) .......................... 2016 1 0021307

(51) Int. Cl.
*G06K 7/08*  (2006.01)
*G06K 7/10*  (2006.01)
(Continued)

(52) U.S. Cl.
CPC ......... *G06K 7/10297* (2013.01); *G06K 17/00* (2013.01); *G06K 19/07* (2013.01); *G06K 19/0712* (2013.01); *G06K 19/0723* (2013.01)

(58) Field of Classification Search
CPC ......... G06K 19/0723; G06K 19/07749; G06K 7/086; G06K 7/10297; G06K 19/07;
(Continued)

(56) References Cited

U.S. PATENT DOCUMENTS 3,842,246 A * 10/1974 Kohler ................... G06K 7/086
235/439
6,340,116 B1 * 1/2002 Cecil ..................... G07F 7/1008
235/492

(Continued)

FOREIGN PATENT DOCUMENTS

CN          1877596 A     12/2006
CN       101131736 A      2/2008
(Continued)

OTHER PUBLICATIONS

Translation for CN101131736A, all pages pertinent.*
(Continued)

*Primary Examiner* — Thien T Mai
(74) *Attorney, Agent, or Firm* — BakerHostetler

(57) ABSTRACT

A method and a device for keeping an active state of a smart card until re-entering a field, and a smart card are provided. The method includes: sending a waiting time extension instruction by a smart card to an electronic device when the smart card is in an electromagnetic field of the electronic device and in an active state; starting a timer after the smart card receives a reply in response to the waiting time extension instruction; detecting that the smart card leaves the field, determining whether the timer times out, and keeping a current state of the smart card as the active state when the timer does not time out and detecting that the smart card re-enters the field, determining whether the timer times out, and keeping the current state of the smart card as the active state when the timer does not time out.

19 Claims, 3 Drawing Sheets

(51) Int. Cl.
 *G06K 19/07* (2006.01)
 *G06K 17/00* (2006.01)

(58) Field of Classification Search
 CPC .............. G06K 17/00; G06K 19/0712; G06K 17/0022; G06K 19/0702; G06K 19/0708; G06Q 20/341; G06Q 20/387; G06Q 20/352; G07F 7/0833; G07F 7/0846; H04W 60/005
 See application file for complete search history.

(56) References Cited

U.S. PATENT DOCUMENTS

| | | | | |
|---|---|---|---|---|
| 6,622,922 | B1* | 9/2003 | Adrial | G06K 7/0008 235/380 |
| 2007/0026893 | A1 | 2/2007 | Sakamoto et al. | |
| 2008/0040287 | A1* | 2/2008 | Harrell | G06Q 20/347 705/71 |
| 2008/0169350 | A1* | 7/2008 | Audebert | G06F 21/31 235/492 |
| 2012/0313761 | A1* | 12/2012 | Rolin | G06K 19/0723 340/10.5 |
| 2013/0017862 | A1* | 1/2013 | Lee | H04W 60/005 455/558 |
| 2014/0019352 | A1* | 1/2014 | Shrivastava | G06Q 20/3674 705/41 |

FOREIGN PATENT DOCUMENTS

| | | |
|---|---|---|
| CN | 102316226 A | 1/2012 |
| CN | 105938539 A | 9/2016 |
| CN | 105938566 A | 9/2016 |

OTHER PUBLICATIONS

International Patent Application No. PCT/CN2017/071007; Int'l Written Opinion and the Search Report; dated Mar. 31, 2017; 9 pages.

* cited by examiner

METHOD FOR KEEPING ACTIVE STATE OF SMART CARD UNTIL RE-ENTERING FIELD, AND SMART CARD

CROSS-REFERENCE TO RELATED APPLICATION

This application is a US national application of International Application No. PCT/CN 2017/071007, filed Jan. 12, 2017, which claims priority to and benefits of Chinese Patent Application Serial No. 201610021307.9, filed on Jan. 13, 2016, and entitled with "METHOD FOR KEEPING WORKING STATE OF SMART CARD ENTERING FIELD AGAIN, AND SMART CARD".

FIELD

The present disclosure relates to the field of smart card, and more particularly, to a method for keeping an active state of a smart card until re-entering a field and a smart card.

BACKGROUND

In the related art, when a smart card communicates with an electronic device (e.g., a radio frequency (RF) read/write device supporting a carrier frequency of 13.56 MHz, such as a near field communication (NEC) RE read write device), the distance between the smart card and the electronic device is so small that the smart card can be in an electromagnetic field of the electronic device, and can acquire energy from the electromagnetic field of the electronic device. In the related art, when the smart card enters the field (i.e., the smart card enters the electromagnetic field of the electronic device to acquire energy), the smart card needs to interact with the electronic device so that the smart card can be changed from an power-off state to an active state via an idle state, after the smart card leaves the field (i.e., the smart card is far away from the electromagnetic field of the electronic device), the smart card changes from the active state to the power-off state. When the smart card needs to perform subsequent operations to re-enter the field, the smart card needs to interact with the electronic device again so that the smart card can be changed from the power-off state to the active state via the idle state, to perform subsequent operation. However, the communication process between the smart card and the electronic device is complicated when the smart card re-enters the field, it is required to interact with the electronic device to change the state again, which takes much time and efficiency is low.

SUMMARY

An aspect of embodiments of the present disclosure provides a method for keeping an active state of a smart card until re-entering a field. The method includes: sending a waiting time extension instruction by a smart card to an electronic device when the smart card is in an electromagnetic field of the electronic device and in an active state, the waiting time extension instruction including at least a preset waiting duration; starting a timer after the smart card receives a reply returned by the electronic device in response, to the waiting time extension instruction, a timing duration of the timer being the preset waiting duration; detecting by the smart card that the smart card leaves the field, determining whether the timer times out, and keeping a current state of the smart card as the active state when the tinier does not time out, in which the smart card is powered by a built-in power supply of the smart card when the smart card leaves the field; and detecting by the smart card that the smart card re-enters the field, determining whether the timer times out, and keeping the current state of the smart card as the active state when the timer does not time out.

Another aspect of embodiments of the present disclosure provides a smart card. The smart card includes a sending module, a receiving module, a timer and a control module. The sending module is configured to send a waiting time extension instruction to an electronic device when the smart card is in an electromagnetic field of the electronic device and in an active state. The waiting time extension instruction at least includes a preset waiting duration. The receiving module is configured to trigger a timer to start timing after receiving a reply returned by the electronic device in response to the waiting time extension instruction. The timer is configured to start timing after being triggered by the receiving module. A timing duration is the preset waiting duration. The control module is configured to determine whether the timer times out after detecting that smart card leaves the field, and keep a current state of the smart card as the active state when the timer does not time out. When the smart card leaves the field, the smart card is powered by a built-in power supply of the smart card. The control module is further configured to determine whether the timer times out after detecting that smart card re-enters the field, and keep the current state of the smart card as the active state when the timer does not time out.

Another aspect of embodiments of the present disclosure provides a smart card, including one or more processors, a memory and one or more programs. The one or more programs are stored in the memory, and when executed by the one or more processors, perform following operations: sending a waiting time extension instruction by a smart card to an electronic device when monitoring that the smart card is m an electromagnetic field of the electronic device and in an active state, the waiting time extension instruction including at least a preset waiting duration; starting a timer after the smart card receives a reply returned by the electronic device in response to the waiting time extension instruction, a timing duration of the timer being the preset waiting duration; detecting by the smart card that the smart card leaves the field, determining whether the timer times out, and keeping a current state of the smart card as the active state when the timer does not time out, in which the smart card is powered by a built-in power supply of the smart card when the smart card leaves the field; and detecting by the smart card that the smart card re-enters the field, determining whether the timer times out, and keeping the current state of the smart card as the active state when the timer does not time out.

BRIEF DESCRIPTION OF THE DRAWINGS

In order to clearly illustrate technical solutions of embodiments of the present disclosure, a brief description of drawings used in embodiments is given below. Obviously, the drawings in the following descriptions are only part embodiments of the present disclosure, and for those skilled in the art, other drawings can be obtained according to these drawings without creative labor.

DETAILED DESCRIPTION

The technical solutions in the embodiments of the present disclosure are clearly and completely described in the following with reference to the accompanying drawings in the embodiments of the present disclosure. Obviously, the embodiments in the following description are merely a part rather than all of the embodiments of the present disclosure. Based on the embodiments of the present disclosure, all other embodiments obtained by persons of ordinary skill in the art without creative efforts shall fall within the protection scope of the present disclosure.

In the description of the present disclosure, it should be understood that, terms such as "first" and "second" are used herein for purposes of description and are not intended to indicate or imply relative importance or quantity or position.

In the following, the present disclosure will be described in detail with reference to embodiments and the accompanying drawings.

Embodiment 1

Figure 1:
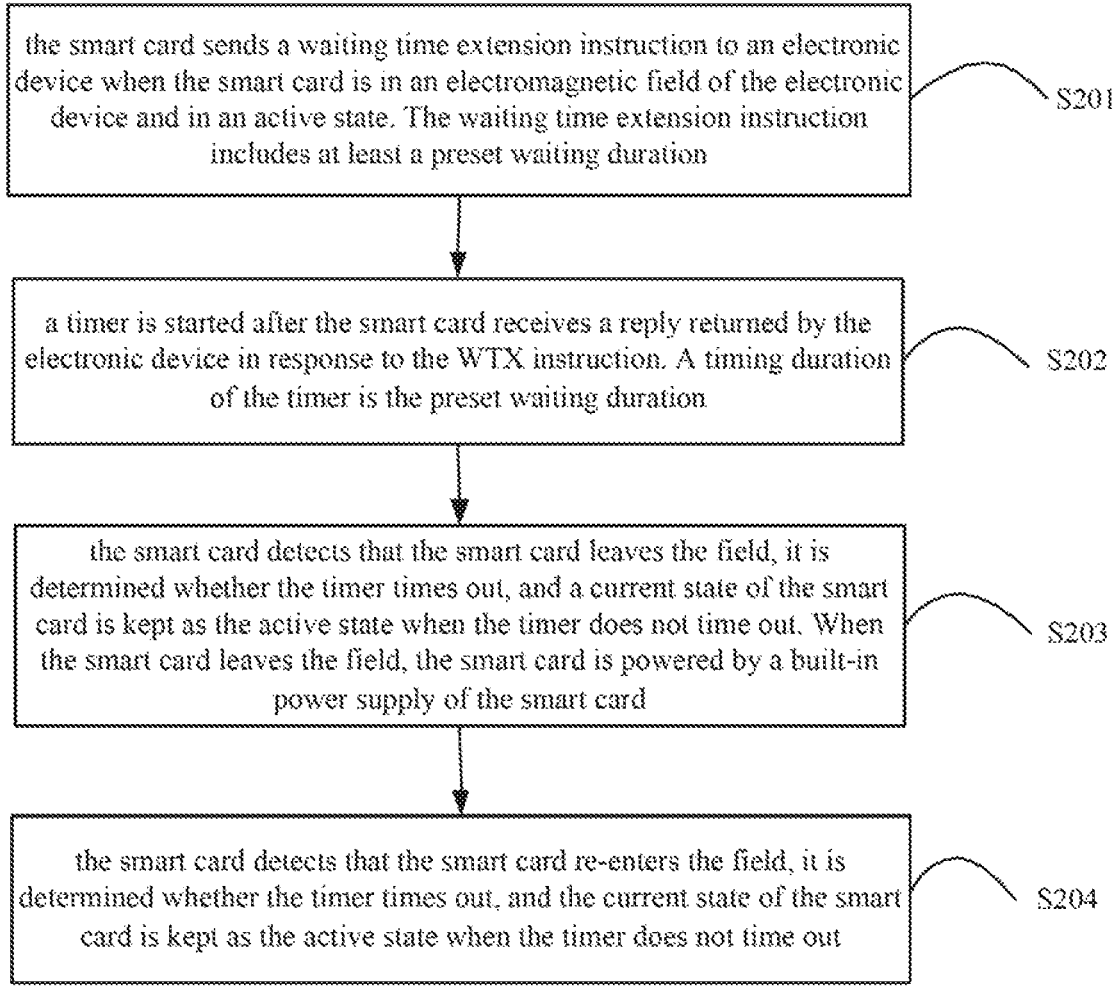
FIG. 1 is a flow chart of a smart card leaving a field and re-entering a field according to Embodiment 1 of the present disclosure.

Embodiments of the present disclosure provide a method for keeping an active state of a smart card until re-entering a field. FIG. 1 is a flow chart of a smart card leaving a field and re-entering a field according to an embodiment of the present disclosure. As illustrated in FIG. 1, the method may include followings (block S201 to block S204).

At block S201, the smart card sends a waiting time extension instruction to an electronic device when the smart card is in an electromagnetic field of the electronic device and in an active state. The waiting time extension instruction includes at least a preset waiting duration.

In an embodiment, the electronic device may be a RF read/write device supporting a carrier frequency of 13.56 MHz (such as a NFC reader, a NFC mobile phone, etc.), which can provide the electromagnetic field in a certain range. The smart card may be a contactless smart card supporting a carrier frequency of 13.56 MHz. When the smart card enters the electromagnetic field of the electronic device, the smart card can acquire energy from the electromagnetic field of the electronic device, and receive a trigger command of the electronic device, such that the smart card be changed from a power-off state to an active state, to trigger the smart card to communicate with the electronic device. The smart card can communicate with the electronic device in a non-contact manner (such as NFC communication, RF communication etc.). In addition, the smart card may also have a built-in power supply. The built-in power supply can provide power for the smart card. The smart card may also have functions such as display, key input, etc., so as to prompt the user, facilitate user input and improve user experience. Moreover, the smart card may also include a security chip. The security chip may be configured to complete functions such as electronic signature, signature verification, dynamic password generation and/or verification, so as to improve security of the smart card.

In the embodiment, the smart card sends a waiting time extension (WTX) instruction to the electronic device. The WTX instruction may include a preset waiting duration. The WTX instruction may be configured to instruct the electronic device to wait for the preset waiting duration before performing subsequent operations. The preset waiting duration may be determined according to user's needs or calculated by smart card according to needs, and may also be changed according to the energy power of the electromagnetic field of the electronic device. With the WTX instruction provided in the embodiment, the electronic device still waits for operations of the smart card in the preset waiting duration. When the smart card re-enters the field after leaving the field during the waiting process of the electronic device, the smart card is still in the active state, and does not need to interact with the electronic device to switch the state again, thus time is saved and efficiency is improved.

As an alternative implementation in the embodiment, before the smart card sends the WTX instruction to the electronic device, the method provided by this embodiment may further include operations of the smart card acquiring the preset waiting duration. In a specific implementation, the smart card may acquire the waiting duration from outside, for example, the user inputs the waiting duration. The smart card may also calculate the waiting duration according to a preset algorithm and specific parameters, for example, the smart card can acquire a frame waiting time (FWT) and a waiting time extension multiplier (WTXM), and calculate the preset waiting duration $Tw=FWT \times WTXM$ according to the FWT and the WTXM.

In general, a frame waiting time integer (FWI) has a value of 0~14. When FWI=0, the FWT has a minimum value, and the minimum value is 302 μs. When FWI=14, the FWT has a maximum value, and the maximum value is 4949 μs. In general, the WTXM has a value of 1~59. The values of the FWI and WTXM are selected by actual conditions, and the present disclosure is not limited thereto.

In the embodiment, the smart card sending the WTX instruction to the electronic device may be triggered by an instruction initiated by the user, or may be triggered by an operation instruction initiated by the electronic device. The former can ensure that when the user needs the smart card to leave the field, the smart card is instructed to send the WTX instruction, such that the user has control rights. The latter can ensure that the electronic device can reasonably schedule resources or channels according to its own process when communicating with the smart card, such that the electronic device can flexibly control the communication quality with the smart card. Both can achieve the purpose of triggering the smart card to send the WTX instruction to the electronic device.

In an alternative implementation of the embodiment, as an example, the user initiates the instruction to trigger the smart card to send the WTX instruction to the electronic device, before the smart card sends the WTX instruction to the electronic device, the method provided by the embodiment may further include receiving by the smart card a leaving-field instruction input by a user. In a specific implementation, the User can input the leaving-field instruction via a physical/virtual key (button) or keyboard. For example, when the user needs to input a smart card password, the smart card is attached to the electronic device, and it is inconvenient for the user to input. Therefore, the user can input the leaving-field instruction to the smart card via the physical keyboard or the virtual keyboard to instruct the smart card to leave the field. The smart card sends the WTX instruction to the electronic device, after the smart card receives a reply returned by the electronic device in response to the WTX instruction, the user can remove the smart card from the electronic device (the smart card leaves the field), and input the smart card password, thereby facilitating user's operation.

In another alternative implementation of the embodiment, as an example, the electronic device initiates the operation instruction to trigger the smart card to send the WTX instruction to the electronic, device, before the smart card sends the WTX instruction to the electronic device, the smart card receives an operation command sent by the electronic device. For example, the operation command sent by the electronic device and received by the smart card may be a read/write operation command, but the smart card needs the electronic device to wait for 20 ms, then the smart card can send a WTX instruction with 20 ms to the electronic device. Then, the electronic device will read and write with the smart card after 20 ms. For another example, the operation command sent by the electronic device and received by the receiving module 102 may be a charging command, i.e., a command that the electronic device charges the smart card. The smart card needs the electronic device to wait for 20 ms and charge the smart card in the 20 ms, then the smart card can send a WTX instruction with 20 ms to the electronic device, and in the waiting duration of 20 ms, the electronic device charges the smart card, thus energy source of the smart card can be effectively ensured.

At block S202, a timer is started after the smart card receives a reply returned by the electronic device in response to the WTX instruction. A timing duration of the tinier is the preset waiting duration.

In the embodiment, after the electronic device receives the WTX instruction, if the electronic device agrees with the WTX request of the smart card, the electronic device can send a reply in response to the WTX instruction to the smart card to inform the smart card that the electronic device has agreed with the WTX request, and perform subsequent operation after waits for the preset waiting duration. When the smart card receives the reply returned by the electronic device, the smart card immediately starts the timer, and the timer starts timing. The time duration of the timer is consistent with the preset waiting duration. Similarly, the electronic device is also provided with a timer, and the timer of the electronic device is also started after the reply is sent. The time duration of the timer of the electronic device is also the preset waiting duration. With the timers of the smart card and the electronic device, time of the smart card leaving the field can be controlled, and as long as the smart card can re-enter the field before its timer times out, the smart card does not need to switch the state. Thus, time for the smart card to re-enter the field is saved, and efficiency of re-entering the field is increased.

At block S203, the smart card detects that the smart card leaves the field, it is determined whether the timer times out, and a current state of the smart card is kept as the active state when the timer does not time out. When the smart card leaves the field, the smart card is powered by a built-in power supply of the smart card.

In the embodiment, during the time that the smart card leaves the field, since the smart card of the present disclosure has a built-in power supply, the smart card can be powered by the built-in power supply. Therefore, if the length of leaving time of the smart card is less than the timing duration of the timer, in other words, if the smart card re-enters the field before its timer times out, the smart card is always in the active state when it leaves the field. When smart card re-enters the field, the timer of the electronic device does not time out, and the electronic device is still waiting. In this case, once the timer of the electronic device times out, the electronic device may continue to communicate with the smart card, the electronic device may consider that the smart card is always in the active state and never leaves the field, the electronic device will only send interactive instructions after the active state to the smart card, and will not restart flows of the smart card entering the field. Thus, even when the smart card leaves the field, the smart card is still in the active state, and does not need to switch the state, time for the smart card to re-enter the field is saved, and efficiency of re-entering the field is improved.

In the embodiment, if the length of leaving time of the smart card is more than the timing duration of the timer, in other words, the smart card re-enters the field after its timer times out, the timer of the electronic device also times out. The electronic device will no longer wait after its timer times out, but enter a card-finding process, the smart card changes from the active state to the leaving-field state, and continues to perform flows of entering the field with the electronic device, i.e., the smart card needs to switch from an initial leaving-field state to an idle state, from the idle state to a ready state, and from the ready state to the active state, and subsequent communication can be continued.

In detail, there are many ways for the smart card to leave the field, and the present disclosure only takes following two ways as examples for illustration.

A1: The smart card is away from the electronic device. The distance between the smart card and the electronic device is greater than a maximum distance that the electronic device provides energy of the electromagnetic field, and the smart card leaves the field. This way of leaving the field refers to that the smart card is physically away from the electronic device, that is, a physical distance between the smart card and the electronic device is greater than the maximum distance that the electronic device provides energy of the electromagnetic field. The maximum distance can be set according to experience of those skilled in the art, such as 0.2 m, as long as the user is in a comfortable state when using the smart card, which is not limited in embodiments of the present disclosure.

A2: A main control chip of the smart card is disconnected from a coil of the smart card. This way of leaving the field is not physically far away, but means that the main control chip of the smart card is disconnected from the coil of the smart card, and because of the smart card is not far away from the electronic device, the coil of the smart card can still acquire energy from the electromagnetic field of the electronic device, but the main control chip can no longer communicate with the electronic device through the coil, and can no longer acquire energy from the electromagnetic field of the electronic device through the coil, and the smart card is regard as leaves the field.

For the second way of leaving the field (i.e., the A2 way of leaving the field), after the smart card detects that the smart Laid leaves the field and before re-enters the field, the main control chip of the smart card is disconnected from the coil of the smart card. The main control chip of the smart card cannot acquire energy of the electromagnetic field of the electronic device through the coil, but the coil of the smart card can still acquire energy from the electronic device. The coil of the smart card can transmit the acquired energy to a rectifying circuit connected to the coil, so as to charge a charging device (such as a rechargeable battery, or a charging capacitor, etc.) of the smart card. Therefore, as an alternative implementation in the embodiment, before the smart card sends the WTX instruction to the electronic device at block S201, the method provided in the embodiment may further include that the smart card receives an operation command sent by the electronic device. The operation command at least includes a charging command. After it is detected that smart card leaves the field at block S203, and before it is detected that the smart card re-enters the field, the method provided in this embodiment may further include that a coil of the smart card acquires energy from the electromagnetic field of the electronic device, so as to charge the charging device (such as a rechargeable battery, or a charging capacitor, etc.) of the smart card. With the alternative implementation of this embodiment, even if the smart card leaves the field, the smart card can still be charged by the electromagnetic field of the electronic device, and charging efficiency is improved.

For the above two ways of the smart card leaving the field, the smart card can detect that the smart card leaves the field by detecting that a rectified voltage of the smart card changes from a high level to a low level. In a specific implementation process, in the above two ways of leaving the field, correspondingly, the detection method may include at least following two conditions.

B1: It is detected that a rectified voltage of a rectifying circuit or a main control chip connected to the coil of the smart card changes from a high level to a low level.

In this mode, for the first way of the smart card leaving the field (i.e., the A1 way of leaving the field), when the smart card is physically away from the electronic device, the coil of the smart card may gradually fail to sense the electromagnetic field of the electronic device, and the rectifying circuit or the main control chip connected to the coil may also gradually fail to acquire power from the coil. Therefore, the rectified voltage outputted by the rectifying circuit and the rectified voltage outputted by the main control chip may change from the high level to the low level, and the smart card detects that the smart card leaves the field.

B2. It is detected that a rectified voltage of a main control chip connected to the coil of the smart card changes from a high level to a low level.

In this mode, for the second way of the smart card leaving the field, i.e., the A2 way of leaving the field, when the smart card is not physically far away from the electronic device and only main control chip of the smart card is disconnected from the coil of the smart card, although the coil of the smart card can still acquire energy from the electromagnetic field of the electronic device, the main control chip of the smart card cannot acquire energy from the electromagnetic field of the electronic device through the coil. Therefore, the rectified voltage outputted by the main control chip changes from the high level to the low level, and the smart card detects that the smart card leaves the field.

With the detection method in the alternative implementation of the embodiment, regardless of the way of leaving the field, the smart card can accurately detect whether the smart card leaves the field, and by detecting the change of the rectified voltage, it is very simple and inexpensive to implement the circuit, in addition to being able to accurately determine whether the smart card leaves the field.

At block S204, the smart card detects that the smart card re-enters the field, it is determined whether the timer times out, and the current state of the smart card is kept as the active state when the tinier does not time out.

In this step, when the smart card re-enters the field before its timer times out, the timer of the electronic device does not time out and the electronic device is still waiting. When the timer of the electronic device times out, the electronic device may continue to communicate with the smart card, the electronic device may consider that the smart card is always in the active state and never leaves the field, the electronic device will only send interactive instructions after the active state to the smart card, and will not restart flows of the smart card entering the field. The smart card re-enters the field after leaving the field, the smart card is still in the active state, and does not need to switch the state, thus time for the smart card to re-enter the field is saved, and efficiency of re-entering the field is improved.

In the embodiment, corresponding to the above implementations of the smart card leaving the field, there may also be the following two ways of the smart card re-entering the field.

C1: The smart card approaches the electronic device, in which, the smart card slowly approaches the electronic device from a place far away from the electronic device. When the smart card approaches the electronic device, the distance between the smart card and the electronic device is less than the maximum distance that the electronic device provides energy of the electromagnetic field, and the smart card re-enters the field. This way of re-entering the filed corresponds to the above-mentioned first way of leaving the field (i.e., the A1 way of leaving the field), which refers to that the smart card physically approaches the electronic device.

C2: The main control chip of the smart card is connected to the coil of the smart card. This way of re-entering the field is not a physical approach, but refers to that in above-mentioned second way of leaving the field (i.e., the A2 way of leaving the field), a disconnected link between the main control chip of the smart card and the coil of the smart card is reconnected. The main control chip of the smart card can communicate with the electronic device through the coil, and acquire energy from the electromagnetic field of the electronic device through the coil. The smart card enters the field.

For the above two ways of the smart card entering the field, the smart card can detect that the smart card re-enters the field by detecting that a rectified voltage of the smart card changes from a low level to a high level. In a specific implementation process, in the above two ways of re-entering the field, correspondingly, the detection method may include at least the following two conditions.

D1: It is detected that a rectified voltage of a rectifying circuit or a main control chip of the smart card connected to the coil of the smart card changes from a low level to a high level.

In this mode, for the first way of the smart card entering the field, i.e., the C1 way of entering the field, when the smart card physically approaches the electronic device, the coil of the smart card may gradually sense the electromagnetic field of the electronic device, and the rectifying circuit or the main control chip connected to the coil may gradually increase power taken from the coil. Therefore, the rectified voltage outputted by the rectifying circuit and the rectified voltage outputted by the main control chip may change from the low level to the high level, and the smart card detects that the smart card re-enters the field.

D2: It is detected that a rectified voltage of a main control chip connected to the coil of the smart card changes from a low level to a high level.

In this mode, for the second way of the smart card entering the field, i.e., the C2 way of entering the field, when the smart card is not physically approaches the electronic device and only the disconnected link between the main control chip of the smart card and the coil of the smart card is reconnected, the main control chip of the smart card can acquire energy from the electromagnetic field of the electronic device through the coil, the rectified voltage outputted by the main control chip changes from the low level to the high level, and the smart card detects that the smart card re-enters the field.

With the detection method in the alternative implementation of the embodiment, regardless of the way of entering the field, the smart card can accurately detect whether the smart card re-enters the field, and by detecting the change of the rectified voltage, it is very simple and inexpensive to implement the circuit, in addition to being able to accurately determine whether the smart card re-enters the field.

Figure 2:
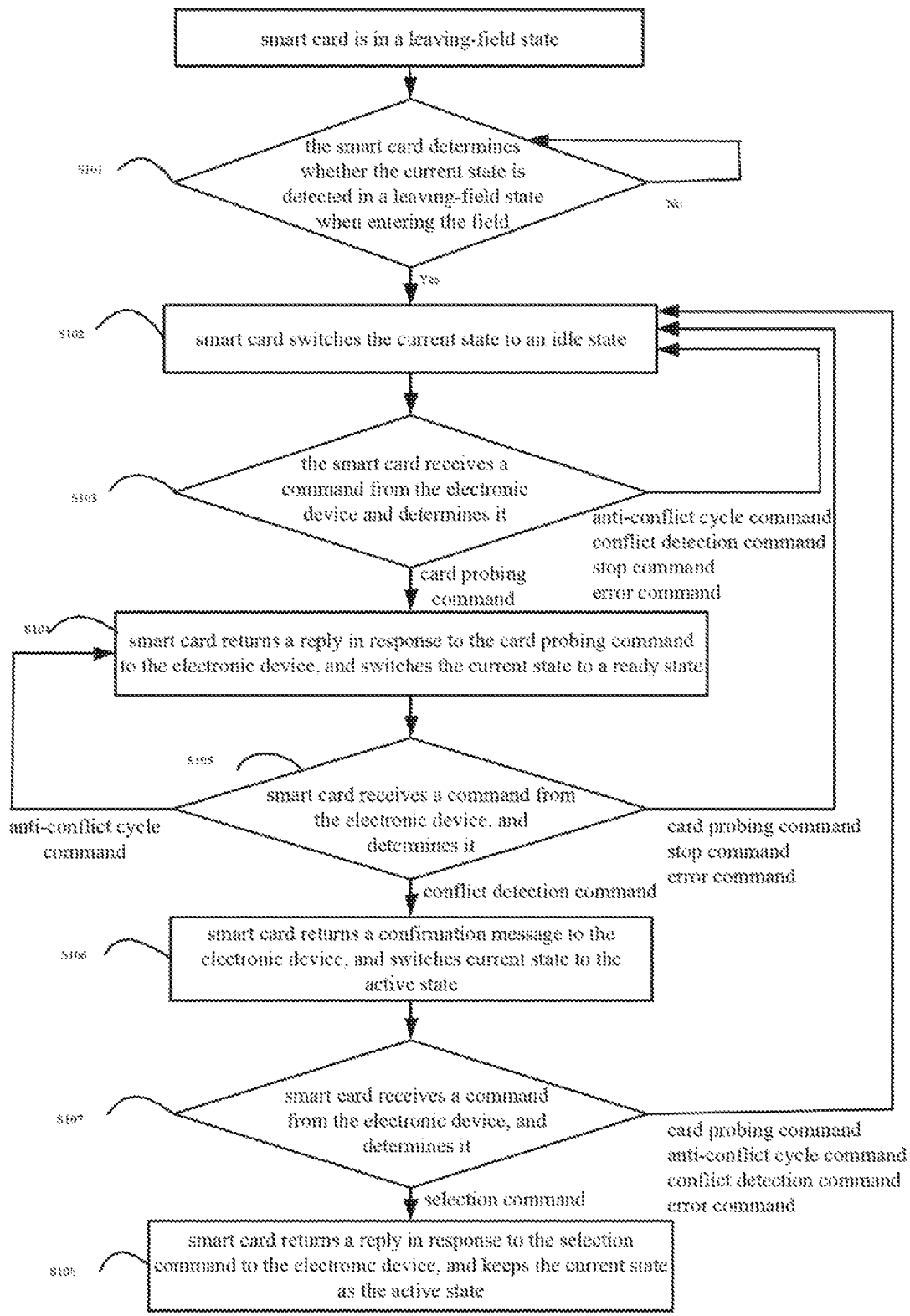
FIG. 2 is a flow chart of a smart card entering a field for the first time according to Embodiment 2 of the present disclosure.

In an alternative implementation of embodiments, before the smart card is in the electromagnetic field of the electronic device and in the active state, that is, before block S201, as illustrated in FIG. 2, the method may farther include followings (block S101 to block S108).

At block S101, the smart card determines whether the current state is detected in a leaving-field state when entering the field, if yes, block S102 is performed, otherwise, the smart card keeps the current state as the leaving-field state, block S101 is performed.

In a specific implementation, in the leaving-field state, the smart card generally enters the field in the above first way of entering the field (i.e., the C1 way of entering the field), the smart card physically approaches the electronic device, the coil of the smart card can gradually sense the electromagnetic field of the electronic device, and the rectifying circuit or the main control chip connected to coil can gradually increase power taken from the coil. Therefore, in detail, the smart card determining whether the current state is detected in the leaving-field state when entering the field that the smart card determines whether a rectified voltage outputted by a rectifying circuit or a main control chip of the smart card connected to the coil changes from a low level to a high level. When the smart card detects that the rectified voltage outputted by the rectifying circuit and the rectified voltage outputted by the main control chip change from the low level to the high level, the smart card can detect that the smart card enters the field in the leaving-field state. When it is detected that smart card enters the field, block S102 is performed, otherwise the smart card is still in the leaving-field state, and block S101 is continued.

At block S102, the smart card switches the current state to an idle state.

In a specific implementation, when the smart card enters the field in the leaving-field state and determines that the rectified voltage changes from the low level to the high level, the smart card may know that it is in the entering-field state, and the smart card can switch from the leaving-field state to the idle state.

At block S103, the smart card receives a command from the electronic device, and determines the command received from the electronic device. When the received command is one of an anti-conflict cycle command, a conflict detection command, a stop command and an error command, block S102 is performed. When the received command is a card probing command, block S104 is performed.

In a specific implementation, the anti-conflict cycle command is a cycle command for preventing command conflicts. Therefore, when the smart card is in the idle state, the smart card keeps the idle state after the anti-conflict cycle command is received.

The conflict detection command is a command for detecting whether there are multiple smart cards in the electromagnetic field of the electronic device. Only when the smart card is in the ready state, operations corresponding to the conflict detection command can be performed, and when the smart card is in the idle state, even if the conflict detection command is received, operations corresponding to the conflict detection command will not be performed. Therefore, when the smart card is in the idle state, the smart card keeps the idle state after the conflict detection command is received.

The stop command refers to a command for stopping operation of the smart card, and the command that the electronic device forces the smart card to stop operating when the electronic device encounters a system failure. Therefore, when the smart card is in the idle state, after the stop command is received, the smart card will no longer perform subsequent operations, and the smart card keeps in the idle state.

The error command is an error indication given by the electronic device to the smart card when an operating error occurs in the electronic device. Therefore, when the smart card is in the idle state, after the error command is received, the smart card no longer performs subsequent operations, and the smart card keeps in the idle state.

Therefore, when the smart card receives one of the foregoing commands, the current state of the smart card does not change, and the smart card continues to perform block S103, to receive the command from the electronic device, and determine the type of the received command.

In a specific implementation, the card probing command is a command performed by the electronic device to detect the smart card in the electromagnetic field of the electronic device. When the electronic device sends the card probing command, it is detected whether there is a smart card protocol matched in the electromagnetic field of the electronic device, the smart card may return a reply to the electronic device, i.e. the smart card performs block S104.

At block S104, the smart card returns a reply in response to the card probing command to the electronic device, and the smart card switches the current state to a ready state.

In a specific implementation, when the electronic device sends the card probing command to detect whether there is a smart card protocol matched in the electromagnetic field of the electronic device, when the smart card receives the card probing command sent by the electronic device, the smart card returns a reply in response to the card probing command to inform the electronic device that there is the smart card protocol matched in its electromagnetic field, and the smart card switches the current state to the ready state. For example, when the electronic device is a NFC device, the NFC device detects whether the smart card in its electromagnetic field supports NFC communication. When the smart card receives the card probing command sent by the NFC device, if the smart card supports NFC communication, the smart card may return a reply to inform the NFC device that there is the smart card supporting the NFC communication in its electromagnetic field, and switch the current state to the ready state.

At block S105, the smart card receives a command from the electronic device, and determines the command received from the electronic device. When the received command is one of a card probing command, a stop command and an error command, block S102 is returned. When the received command is the anti-conflict cycle command, block S105 is continued. When the received command is the conflict detection command, block S106 is performed.

The card probing command is a command performed by the electronic device to detect the smart card in the electromagnetic field of the electronic device, and is the command to switch from an idle state to a ready state when the smart card is in the idle state. Therefore, when the smart card is in the ready state, the smart card switches the current state to the idle state after the card probing command is received, i.e., block S102 is returned.

The stop command refers to a command for stopping operation of the smart card, and the command that the electronic device forces the smart card to stop operating when the electronic device encounters a system failure. Therefore, when the smart card is in the ready state, after the stop command is received, the smart card no longer performs subsequent operations and switches the current state to the idle state, i.e., block S102 is returned.

The error command is an error indication given by the electronic device to the smart card when an operating error occurs in the electronic device. Therefore, when the smart card is in the ready state, after the error command is received, the smart card no longer performs subsequent operations and switches the current state to the idle state. Therefore, when the smart card receives one of the above commands, block S102 is returned.

The anti-conflict cycle command is a cycle command for preventing command conflicts. Therefore, when the smart card is in a ready state, after the anti-conflict cycle command is received, the smart card continues to perform block S105, i.e., the smart card may keep the current state as the ready state, and continue to determine the command received from the electronic device.

Since the conflict detection command is a command for detecting whether there are multiple smart cards in the electromagnetic field of the electronic device. Therefore, when the smart card is in the ready state, after the conflict detection command is received, block S106 is performed, i.e., the smart card returns a confirmation message to the electronic device.

At block S106, the smart card returns a confirmation message to the electronic device, and switches current state to the active state. The confirmation message includes a unique identification UID of the smart card.

When the smart card is in the ready state, after the conflict detection command is received, since the confirmation message returned by the smart card to the electronic device includes the UID of the smart card, it ensures that the current electronic device can only communicate with the smart card. When the smart card is in the active state, the electronic device can perform data communication with the smart card.

At block S107, the smart card receives a command from the electronic device, and determines the command received from the electronic device. When the received command is one of a card probing command, an anti-conflict cycle command, a conflict detection command and an error command, block S102 is performed. When the received command is a selection command, block S108 is performed.

The selection command refers to a command sent by the electronic device after the electronic device selects to communicate with the smart card. Only when the smart card is in the active state, operations corresponding to the selection command can be performed, when the smart card is in other states, even if the selection command is received, the operations corresponding to the selection command will not be performed. Therefore, when the smart card is in the active state, when the electronic device selects to communicate with the smart card, the electronic device may send the selection command to the smart card to instruct the smart card that electronic device has selected to communicate with the smart card.

At block S108, the smart card returns a reply in response to the selection command to the electronic device, and the smart card keeps the current state as the active state. The reply in response to the selection command includes at least one of a waiting time, a baud rate, a history byte and a manufacturer code supported by the smart card.

With blocks S101 to S108, the smart card switches from the leaving-field state to the idle state, from the idle state to the ready state, and from the ready state to the active state, and then operations of blocks S201 to step S204 can be performed.

With the method for keeping an active state of a smart card until re-entering a field provided by embodiments of the present disclosure, the smart card sends a WTX instruction to the electronic device before leaving the field, and the smart card is powered by a built-in power supply of the smart card after leaving the field, such that the smart card still keeps the active state until the smart card re-enters the field in the preset waiting duration, and does not need to interact with the electronic device to switch the state again, thereby simplifying communication process between the smart card and the electronic device, saving the time for the smart card to re-enter the field, and improving efficiency of re-entering the field.

Embodiment 2

Figure 3:
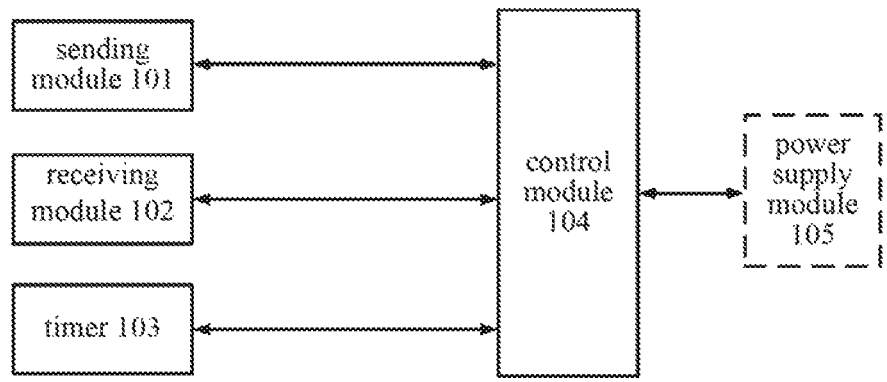
FIG. 3 is a schematic diagram of a smart card according to Embodiment 2 of the present disclosure.

Embodiments of the present disclosure provide a smart card. FIG. 3 is a schematic diagram of a smart card provided by embodiments of the present disclosure. As illustrated in FIG. 3, the smart card includes a sending module 101, a receiving module 102, a timer 103, a control module 104 and a power supply module 105.

In the embodiment, the sending module 101 is configured to send a WTX instruction to an electronic device when the smart card is in an electromagnetic field of the electronic device and in am active state. The WTX instruction at least includes a preset waiting duration. The receiving module 102 is configured to trigger a timer 103 to start timing after receiving a reply returned by the electronic device in response to the WTX instruction. The timer 103 is configured to start timing after being triggered by the receiving module 102. A timing duration is the preset waiting duration. The control module 104 is configured to determine whether the timer 103 times out after detecting that smart card leaves the field, and keep a current state of the smart card as the active state when the timer 103 does not time out. When the smart card leaves the field, the smart card is powered by a power supply module 105 of the smart card. The control module 104 is further configured to determine whether the timer 103 times out after detecting that smart card re-enters the field, and keep the current state of the smart card as the active state when the timer 103 does not time out. In other words, when the smart card re-enters the field before the timer 103 times out, the electronic device can still recognize the smart card, and perform subsequent communication.

With the smart card provided by embodiments of the present disclosure, a WTX instruction is sent to the electronic device before leaving the field, and the smart card is powered by a power supply module of the smart card after leaving the field, such that the smart card still keeps the active state until the smart card re-enters the field in the preset waiting duration, and does not need to interact with the electronic device to switch the state again, thereby simplifying communication process between the smart card and the electronic device, saving the time for the smart card to re-enter the field, and improving efficiency of re-entering the field.

In an alternative implementation of the embodiment, the sending module 101 sends a WTX instruction to the electronic device. The WTX instruction may include a preset waiting duration. The WTX instruction may be configured to instruct the electronic device to wait for the preset waiting duration before performing subsequent operations. The preset waiting duration may be determined according to user's needs or calculated by smart card according to needs, and may also be changed according to the energy power of the electromagnetic field of the electronic device. With the WTX instruction provided in the embodiment, the electronic device still waits for operations of the smart card in the preset waiting duration. When the smart card re-enters the field after leaving the field during the waiting process of the electronic device, the smart card is still in the active state, and does not need to interact with the electronic device to switch the state again, thus time is saved and efficiency is improved.

In a specific implementation, before the sending module 101 sends the WTX instruction to the electronic device, the control module 104 may need to acquire the preset waiting duration. In a specific implementation, the control module 104 may acquire the waiting duration from outside, for example, the user inputs the waiting duration. The control module 104 may also calculate the waiting duration according to a preset algorithm and specific parameters, for example, the control module 104 can acquire a FWT and a WTXM, and calculate the preset waiting duration Tw=FWT×WTXM according to the FWT and the WTXM.

In general, a FWI has a value of 0~14. When FWI=0, the FWT has a minimum value, and the minimum value is 302 μs. When FWI=14, the FWT has a maximum value, and the maximum value is 4949 μs. In general, the WTXM has a value of 1~59. The values of the FWI and WTXM can be selected by actual conditions, and the present disclosure is not limited thereto.

In the embodiment, the receiving module 102 is further configured to receive an instruction initiated by the user or an operation instruction initiated by the electronic device, so as to trigger the sending module 101 to send the WTX instruction to the electronic device. The instruction initiated by the user can ensure that when the user needs the smart card to leave the field, the smart card is instructed to send the WTX instruction, such that the user has control rights. The operation instruction initiated by the electronic device can ensure that the electronic device reasonably schedules resources or channels according to its own process when communicating with the smart card, such that the electronic device can flexibly control the communication quality with the smart card. Both can achieve the purpose of triggering the smart card to send the WTX instruction to the electronic device.

In an alternative implementation of the embodiment, before the sending module 101 sends the WTX instruction to the electronic device, the receiving module 102 is further configured to receive a leaving-field instruction input by a user. In a specific implementation, the user can input the leaving-field instruction via a physical/virtual key (button) or keyboard of the smart card. For example, when the user needs to input a smart card password, the smart card is attached to the electronic device, and it is inconvenient for the user to input. Therefore, the user can input the leaving-field instruction to the smart card via the physical keyboard or the virtual keyboard to instruct the smart card to leave the field. The control module 104 can trigger the sending module 101 to send the WTX instruction to the electronic device, after the receiving module 102 receives a reply returned by the electronic device in response to the WTX instruction, the user can remove the smart card from the electronic device (the smart card leaves the field), and input the smart card password, thereby facilitating user's operation.

In another alternative implementation of the embodiment, before the sending module 101 sends the WTX instruction to the electronic device, the receiving module 102 receives an operation command sent by the electronic device. In a specific implementation, for example, the operation command, sent by the electronic device and received by the receiving module 102 may be a read/write operation command, but the control module 104 needs the electronic device to wait for 20 ms, then the control module 104 can trigger the sending module 101 to send a WTX instruction with 20 ms to the electronic device. Then, the electronic device will read and write with the smart card after 20 ms.

For another example, the operation command sent by the electronic device and received by the receiving module 102 may be a charging command, i.e., a command that the electronic device charges the smart card. The control module 104 needs the electronic device to wait for 20 ms and charge the smart card in the 20 ms, then the control module 104 can trigger the sending module 101 to send a WTX instruction with 20 ms to the electronic device, and in the waiting duration of 20 ms, the electronic device charges the smart card, thus energy source of the smart card is effectively ensured.

Figure 4:
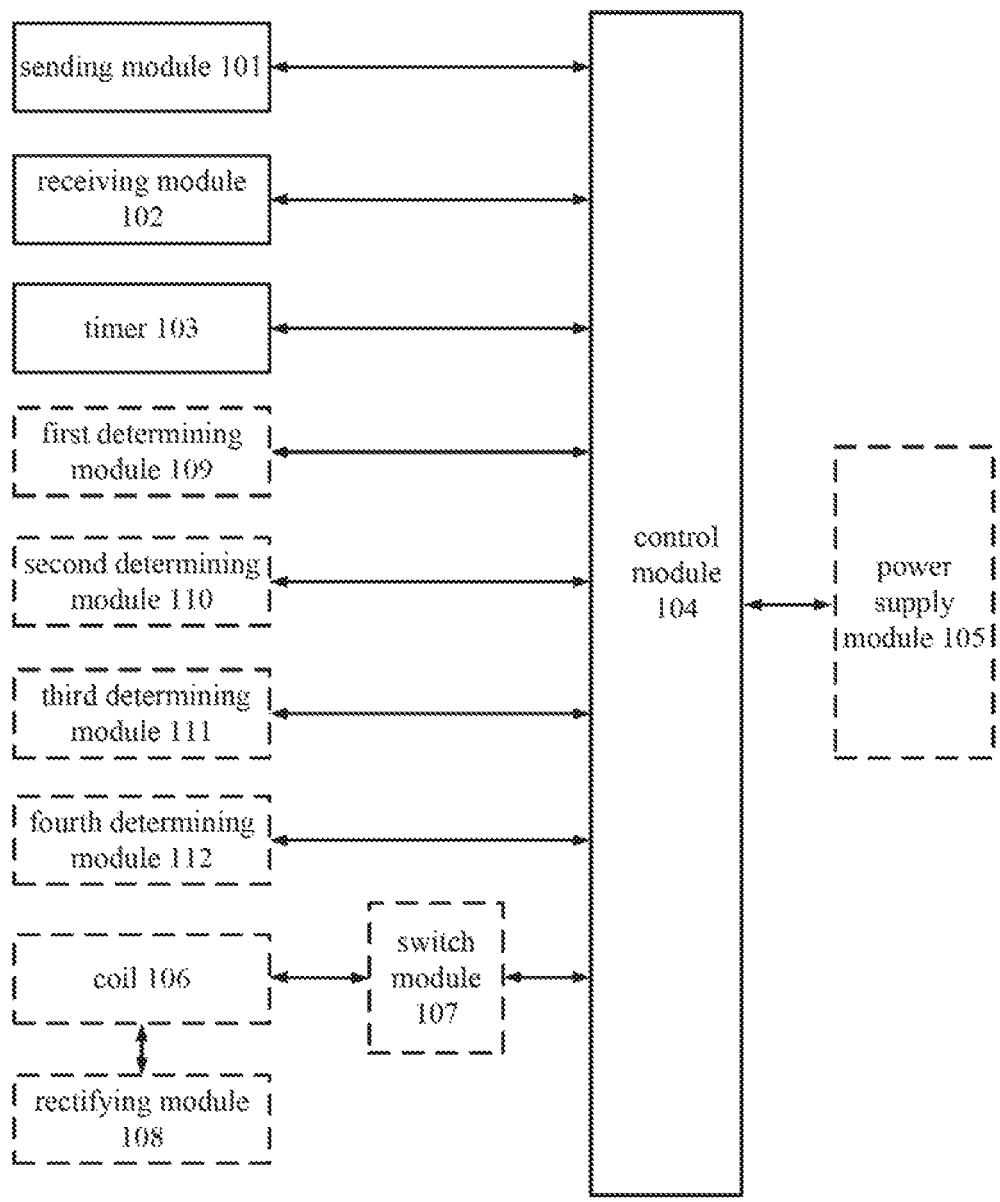
FIG. 4 is an alternative schematic diagram of a smart card according to Embodiment 2 of the present disclosure.

In at least one embodiment, as illustrated in FIG. 4, the smart card further includes a coil 106, a switch module 107 and a rectifying module 108. The coil 106 is configured to sense the electromagnetic field of the electronic device and acquire energy from the electromagnetic field of the electronic device to provide to the rectifying module 108 or the control module 104 of the smart card (i.e., the main control chip of the smart card). The switch module 107 is configured to control the connection and disconnection between the coil 106 and the control module 104. The rectifying module 108 is configured to charge the charging device (such as a rechargeable battery, or a charging capacitor, etc.) of the smart card. For the second way of the leaving the field, i.e., the A2 way of leaving the field, after the control module 104 receives the charging command, the switch module 107 is turn-off, such that the control module 104 of the smart card is disconnected from the coil 106 of the smart card, the control module 104 of the smart card cannot acquire energy from the electromagnetic field of the electronic device through the coil 106, but the rectifying module 108 connected to the coil 106 of the smart card can still acquire energy from the electromagnetic field of the electronic device, so as to charge the charging device (such as a rechargeable battery, or a charging capacitor, etc.) of the smart card. With the embodiment, charging efficiency of the smart card is improved.

In the embodiment, the smart card is provided with a timer 103, after the receiving module 102 receives the reply returned by the electronic device in response to the WTX instruction, the timer 103 is triggered to start timing. The time duration of the timer 103 is the preset waiting duration. Similarly, the electronic device is also provided with a timer, and the timer of the electronic device is also started after the reply is sent. The time duration of the timer of the electronic device is also the preset waiting duration. Timers of the electronic device and the smart card should end at the same time. With the timers of the smart card and the electronic device, time of the smart card leaving the field can be controlled, and as long as the smart card can re-enter the field before its timer times out, the smart card does not need to switch the state. Thus, time for the smart card to re-enter the field is saved, and efficiency of re-entering the field is increased.

In the embodiment, during the time that the smart card leaves the field, since the smart card of the present disclosure has a built-in power supply module 105, the smart card can be powered by the power supply module 105. Therefore, if the length of leaving time of the smart card is less than the timing duration of the timer, in other words, if the smart card re-enters the field before its timer times out, the smart card is always in the active state when it leaves the field. When smart card re-enters the field, the timer of the smart card does not time out, and the timer of the electronic device does not time out, the electronic device is still waiting. When the timer of the electronic device times out, the electronic device may continue to communicate with the smart card, the electronic device may consider that the smart card is always in the active state and never leaves the field, the electronic device will only send interactive instructions after the active state to the smart card, and will not restart flows of the smart card entering the field. Thus, even when the smart card leaves the field, the smart card is still in the active state, and does not need to switch the state, time for the smart card to re-enter the field is saved, and efficiency of re-entering the field is improved.

In the embodiment, when the smart card leaves the field after its timer times out, that is, the smart card re-enters the field after its timer times out, the timer of the electronic device also times out. The electronic device will no longer wait after its timer times out, but enter a card-finding process, the smart card changes from the active state to the leaving-field state, and continues to perform flows of entering the field with the electronic device, i.e., the smart card needs to switch from an initial leaving-field state to an idle state, from the idle state to a ready state, and from the ready state to the active state, and subsequent communication can be continued.

In an alternative implementation of the embodiment, the control module 104 can detect that the smart card leaves the field by detecting that a rectified voltage of the smart card changes from a high level to a low level. In a specific implementation, for the control module 104 detecting that the smart card leaves the field, following two conditions may be included.

E1: It is detected that a rectified voltage of a rectifying module 108 or a control module 104 the main control chip of the smart card) connected to the coil 106 of the smart card changes from a high level to a low level.

For the first way of the smart card leaving the field, i.e., the A1 way of leaving the field, when the smart card is physically away from the electronic device, the coil 106 of the smart card may gradually fail to sense the electromagnetic field of the electronic device, and the rectifying module 108 or the control module 104 connected to the coil may also gradually fail to acquire power from the coil 106. Therefore, the rectified voltage outputted by the rectifying module 108 or the rectified voltage outputted by the control module 104 may change from the high level to the low level, and the control module 104 detects that the smart card leaves the field. When the smart card leaves the field with in the A1 way, when the smart card illustrated in FIG. 4 is applied, it can be detected that rectified voltage of the rectifying module 108 or the control module 104 connected to the coil 106 of the smart card changes from the high level to the low level, and when an ordinary smart card (i.e., a smart card only includes the coil 106 and the control module 104) is applied, it can be detected that rectified voltage of the control module 104 of the smart card changes from the high level to the low level.

E2: it is detected that a rectified voltage of the control module 104 connected to the coil 106 of the smart card changes from a high level to a low level.

For the second way of the smart card leaving the field, i.e., the A2 way of leaving the field, when the smart card is not physically far away from the electronic device and only the switch module 107 is open, the control module 104 of the smart card is disconnected from the coil 106 of the smart card, and the control module 104 of the smart card cannot acquire energy from the electromagnetic field of the electronic device. Therefore, the rectified voltage of the control module 104 will change from the high level to the low level, and the control module 104 detects that the smart card leaves the field. When the smart card leaves the field in the A2 way, whether the smart card illustrated in FIG. 4 or an ordinary smart card (i.e., a smart card only includes the coil 106 and the control module 104) is applied, it can both be detected that rectified voltage of the control module 104 of the smart card changes from the high level to the low level.

With the control module in the alternative implementation of the embodiment, regardless of the way of leaving the field, the control module 104 can accurately detect whether the smart card leaves the field, and the change of the rectified voltage of the rectifying module or the control module connected to the coil of the smart card can be detected, it is very simple to implement the circuit, and cost is low.

In an alternative implementation of the embodiment, the control module 104 can detect that the smart card re-enters the field by detecting that a rectified voltage of the smart card changes from a low level to a high level. In a specific implementation, for the control module 104 detecting that the smart card re-enters the field, following two conditions may be included.

F1: It is detected that a rectified voltage of a rectifying module 108 or a control module 104 connected to the coil 106 of the smart card changes from a low level to a high level.

For the first way of the smart card entering the field, i.e., the C1 way of entering the field, when the smart card physically approaches the electronic device, the coil 106 of the smart card may gradually sense the electromagnetic field of the electronic device, and the rectifying module 108 or the control module 104 connected to the coil 106 may gradually increase power taken from the coil. Therefore, the rectified voltage outputted by the rectifying module 108 and the rectified voltage outputted by the control module 104 may change from the low level to the high level, and the control module 104 detects that the smart card reenters the field. When the smart card enters the field with in the C1 way, when the smart card illustrated in FIG. 4 is applied, it can be detected that rectified voltage of the rectifying module 108 or the control module 104 connected to the coil 106 of the smart card changes from the low level to the high level, and when an ordinary smart card (a smart card only includes the coil 106 and the control module 104) is applied, it can be detected that rectified voltage of the control module 104 of the smart card changes from the low level to the high level.

F2: it is detected that a rectified voltage of the control module 104 connected to the coil 106 of the smart card changes from a low level to a high level.

For the second way of the smart card entering the field, i.e., the C2 way of entering the field, when the smart card is not physically approaches the electronic device and only the switch module 107 is closed, the control module 104 of the smart card is reconnected with the coil 106 of the smart card, and the control module 104 of the smart card can acquire energy from the electromagnetic field of the electronic device through the coil 106. Therefore, the rectified voltage outputted by the control module 104 may change from the low level to the high level, and the control module 104 detects that the smart card re-enters the field. When the smart card enters the field in the C2 way, whether the smart card illustrated in FIG. 4 or an ordinary smart card (i.e., a smart card only includes the coil 106 and the control module 104) is applied, it can both be detected that rectified voltage of the control module 104 of the smart card changes from the low level to the high level.

With the control module in the alternative implementation of the embodiment, regardless of the way of entering the field, the control module can accurately detect whether the smart card re-enters the field, and the change of the rectified voltage of the rectifying module or the control module (i.e., the main control chip of the smart card) connected to the coil of the smart card can be detected, it is very simple to implement the circuit and cost is low.

In another alternative implementation of the embodiment, as illustrated in FIG. 4, the smart card farther includes a first determining module 109, a second determining module 110, a third determining module 111 and a fourth determining module 112.

The first determining module 109 is configured to determine whether the smart card enters the field in a leaving-field state, and send a determination result to the control module 104. The control module 104 is configured to control the smart card to switch the current state to an idle state if the determination result of the first determining module 109 is yes, and otherwise control the smart card to keep the leaving-field state.

In a specific implementation, in the leaving-field state, the smart card generally enters the field in the above first way of entering the field (i.e., the C1 way of entering the field), the smart card physically approaches the electronic device, the coil 106 of the smart card gradually senses the electromagnetic field of the electronic device and acquires energy therefrom, such that the rectified voltage in the rectifying module 108 or the rectified voltage in the control module 104 of the smart card changes from a low level to a high level, the first determining module 109 determines that smart card enters the field, and the control module 104 switches the current state to the idle state.

The receiving module 102 is configured to receive a command sent by the electronic device. The received command includes an anti-conflict cycle command, a conflict detection command, a stop command, an error command, a card probing command and a selection command.

In an implementation process, the anti-conflict cycle command is a cycle command for preventing command conflicts. Therefore, after the receiving module 102 receives the anti-conflict cycle command, the control module 104 controls the smart card to keep the current state.

The conflict detection command is a command for detecting whether there are multiple smart cards in the electromagnetic field of the electronic device. Only when the smart card is in the ready state, operations corresponding to the conflict detection command can be performed, and when the smart card is in other states, even if the conflict detection command is received, operations corresponding to the conflict detection command will not be performed. Therefore, when the smart card is in the ready state, after the receiving module 102 receives the conflict detection command, the control module 104 controls the smart card to switch the ready state to the active state.

The stop command refers to a command for stopping operation of the smart card, and the command that the electronic device forces the smart card to stop operating when the electronic device encounters a system failure. Therefore, after the receiving module 102 receives the stop command, the control module 104 controls the smart card to keep the current state.

The error command is an error indication given by the electronic device to the smart card when an operating error occurs in the electronic device. Therefore, after the receiving module 102 receives the stop command, the control module 104 controls the smart card to keep the current state.

The card probing command is a command performed by the electronic device to detect the smart card in the electromagnetic field of the electronic device. When the electronic device sends the card probing command, it is detected whether there is a smart card protocol matched in the electromagnetic field of the electronic device, after the receiving module 102 receives the card probing command, the sending module 101 may return a reply to the electronic device, to inform the electronic device that there is a smart card protocol matched in its electromagnetic field.

The selection command refers to a command sent by the electronic device after the electronic device selects to communicate with the smart card. Only when the smart card is in the active state, operations corresponding to the selection command can be performed, and when the smart card is in other states, even if the selection command is received, the operations corresponding to the selection command will not be performed. Therefore, when the smart card is in the active state, when the electronic device selects to communicate with the smart card, the electronic device may send the selection command to the smart card to instruct the smart card that electronic device has selected to communicate with the smart card.

The second determining module 110 is configured to determine a command received by the smart card from the electronic device in an idle state. When the command received in the idle state is one of an anti-conflict cycle command, a conflict detection command, a stop command and an error command, the second determining module 110 is configured to notify the control module 104 to control the smart card to keep the current state as the idle state. When the command received in the idle state is a card probing command, the second determining module 110 is configured to notify the control module 104 to return a reply in response to the card probing command and control the smart card to switch the current state to a ready state.

The control module 104 is configured to control the smart card to keep the current state as the idle state when the second determining module 110 determines that the command received in the idle state is one of an anti-conflict cycle command, a conflict detection command, a stop command and an error command. When the second determining module 110 determines that the command received in the idle state is a card probing command, the control module 104 is configured to notify the sending module 101 to return a reply in response to the card probing command to the electronic device, and control the smart card to switch the current state to the ready state.

In a specific implementation, when the receiving module 102 receives one of an anti-conflict cycle command, a conflict detection command, a stop command and an error command, the current state of the smart card does not change, and the control module 104 keeps the current state as the idle state. The card probing command is a command performed by the electronic device to detect the smart card in the electromagnetic field of the electronic device. When the electronic device sends the card probing command to detect whether there is a smart card protocol matched in the electromagnetic field of the electronic device, and the receiving module 102 receives the card probing command sent by the electronic device, the sending module 101 returns a reply in response to the card probing command to inform the electronic device that there is the smart card protocol matched in its electromagnetic field, and the smart card switches the current state to the ready state. Therefore, when the receiving module 102 receives the card probing command, the control module 104 controls the smart card to switch the current state to the ready state. For example, when the electronic device is a NFC device, the NFC device detects whether the smart card in its electromagnetic field supports NFC communication. When the receiving module 102 receives the card probing command sent by the NFC device, if the smart card supports NFC communication, the sending module 101 may return a reply, to inform the NFC device that there is the smart card supporting the NFC communication in its electromagnetic field, and the control module 104 controls the smart card to switch the current state to the ready state.

The third determining module 111 is configured to determine a command received by the smart card from the electronic device in a ready state, and notify the control module 104 to control the smart card to switch the current state to an idle state when the command received in the ready state is one of a card probing command, an anti-conflict cycle command, a stop command and an error command. In a specific implementation, when the receiving module 102 receives one of a card probing command, an anti-conflict cycle command, a stop command and an error command, the control module 104 switches the current state to the idle state. The card probing command is a command performed by the electronic device to detect the smart card in the electromagnetic field of the electronic device, and is the command to switch the smart card from the idle state to the ready state. Therefore, when the smart card is in the ready state, after the receiving module 102 receives the card probing command, the control module 104 switches the current state to the idle state. The anti-conflict cycle command is a cycle command for preventing command conflicts. Therefore, when the smart card is in the ready state, after the receiving module 103 receives anti-conflict cycle command, the control module 104 keeps the current state as the ready state. The conflict detection command is a command for detecting whether there are multiple smart cards in the electromagnetic field of the electronic device. Since a confirmation message returned by the sending module 101 to the electronic device includes a UID of the smart card, it ensures that the current electronic device can only communicate with the smart card. Therefore, the control module 104 controls the smart card to switch the current state to the active state.

The fourth determining module 112 is configured to determine a command received by the smart card from the electronic device in an active state. When the command received in the active state is one of a card probing command, an anti-conflict cycle command, a conflict detection command and an error command, the fourth determining module 112 is configured to notify the control module 104 to control the smart card to switch the current state to the idle state. When the command received in the active state is a selection command, the fourth determining module 112 is configured to notify the control module 104 to return a reply in response to the selection command to the electronic device, and control the smart card to keep the current state as the active state. The reply in response to the selection command includes at least one of a waiting time, a baud rate, a history byte and a manufacturer code supported by the smart card.

The control module 104 is further configured to control the smart card to switch the current state as the idle state when the fourth determining module 112 determines that the command received in the active state is one of a card probing command, an anti-conflict cycle command, a conflict detection command and an error command. When the fourth determining module 112 determines that the command received in the active state is a selection command, the control module 104 is configured to notify the sending module 101 to return a reply in response to the selection command to the electronic device, and control the smart card to keep the current state as the active state. The reply in response to the selection command includes at least one of a waiting time, a baud rate, a history byte and a manufacturer code supported by the smart card.

In a specific implementation, when the receiving module 102 receives one of a card probing command, an anti-conflict cycle command, a conflict detection command and an error command, the control module 104 switches the current state as the idle state. The selection command refers to a command sent by the electronic device after the electronic device selects to communicate with the smart card. Only when the smart card is in the active state, operations corresponding to the selection command can be performed, and when the smart card is in other states, even if the selection command is received, the operations corresponding to the selection command will not be performed. Therefore, when the smart card is in the active state, when the electronic device selects to communicate with the smart card, the electronic device may send the selection command to the smart card to instruct the smart card that electronic device has selected to communicate with the smart card. Therefore, after the receiving module 102 receives the selection command, the sending module 101 returns a reply in response to the selection command, the reply in response to the selection command includes at least one of a waiting time, a baud rate, a history byte and a manufacturer code supported by the smart card, to instruct the electronic device that the smart card will communicate with it.

With the first determining module, the second determining module, the third determining module and the fourth determining module, the smart card switches from the leaving-field state to the idle state, from the idle state to the ready state, and from the ready state to the active state, and then operations after the active state can be performed.

Embodiment 3

Embodiments of the present disclosure further provide a smart card, which can be applied to implement operations performed by the smart card in Embodiment 1. The smart card may include one or more processors, a memory and one or more programs. The one or more programs are stored in the memory, and when the one or more programs are executed by the one or more processors, following operations are performed.

At block S101', when it is monitored that the smart card is in an electromagnetic field of the electronic device and in an active state, a WTX instruction is sent to an electronic device. The WTX instruction includes at least a preset waiting duration.

At block S102', a timer is started after a reply returned by the electronic device in response to the WTX instruction is received. A timing duration of the timer is the preset waiting duration.

At block S103', it is detected that the smart card leaves the field, it is determined whether the timer times out, and a current state of the smart card is kept as the active state when the timer does not time out. When the smart card leaves the field, the smart card is powered by a built-in power supply of the smart card.

At block S104', it is detected that the smart card re-enters the field, it is determined whether the tinier times out, the current state of the smart card is kept as the active state when the timer does not time out.

With the smart card provided by embodiments of the present disclosure, a WTX instruction is sent to the electronic device before leaving the field, and the smart card is powered by a built-in power supply module of the smart card after leaving the field, such that the smart card still keeps the active state until the smart card re-enters the field in the preset waiting duration, and does not need to interact with the electronic device to switch the state again, thereby simplifying communication process between the smart card and the electronic device, saving the time for the smart card to re-enter the field, and improving efficiency of re-entering the field.

Any procedure or method described in the flow charts or described in any other way herein may be understood to include one or more modules, portions or parts for storing executable codes that realize particular logic functions or procedures. Moreover, advantageous embodiments of the present disclosure includes other implementations in which the order of execution is different from that which is depicted or discussed, including executing functions in a substantially simultaneous manner or in an opposite order according to the related functions, which should be understood by those skilled in the art.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be included.

In the description of the specification, reference terms including "all embodiment," "some embodiments," "an example," "a specific example," or "some examples," means that a particular structure, feature, material, or characteristic described in connection with the embodiment or example is included in at least one embodiment or example of the present disclosure. In this specification, the appearances of the phrases of above terms are not necessarily referring to the same embodiment or example of the present disclosure. Furthermore, the particular features, structures, materials, or characteristics may be combined in any suitable manner in one or more embodiments or examples.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A method for keeping an active state of a smart card until re-entering a field, comprising:

sending a waiting time extension instruction by a smart card to an electronic device when the smart card is in an electromagnetic field of the electronic device and in an active state, the waiting time extension instruction comprising at least a preset waiting duration;

starting a timer after the smart card receives a reply returned by the electronic device in response to the waiting time extension instruction, a timing duration of the timer being the preset waiting duration;

detecting by the smart card that the smart card leaves the field, determining whether the timer times out, and keeping a current state of the smart card as the active state when the timer does not time out, wherein the smart card is powered by a built-in power supply of the smart card when the smart card leaves the field; and detecting by the smart card that the smart card re-enters the field, determining whether the timer times out, and keeping the current state of the smart card as the active state when the timer does not time out.

2. The method according to claim 1, wherein detecting by the smart card that the smart card leaves the field comprises:

detecting that a rectified voltage of the smart card changes from a high level to a low level.

3. The method according to claim 1, wherein detecting by the smart card that the smart card re-enters the field comprises:

detecting that the rectified voltage of the smart card changes from a low level to a high level.

4. The method according to claim 1, wherein before sending the waiting time extension instruction by the smart card to the electronic device, the method further comprises:

receiving by the smart card a leaving-field instruction input by a user.

5. The method according to claim 1, wherein before sending the waiting time extension instruction by the smart card to the electronic device, the method further comprises:

receiving by the smart card an operation command sent by the electronic device, the operation command at least comprising a charging command;

after detecting that the smart card leaves the field, and before detecting that the smart card re-enters the field, the method further comprises:

acquiring energy from the electromagnetic field of the electronic device by a coil of the smart card, to charge the smart card.

6. The method according to claim 1, wherein before the smart card is in the electromagnetic field of the electronic device and in the active state, the method further comprises:

determining by the smart card whether the current state is detected in a leaving-field state when entering the field, and switching the current state to an idle state by the smart card in case of the current state is detected in the leaving-field state when entering the field;

receiving a command from the electronic device by the smart card in the idle state, determining the command received from the electronic device, returning by the smart card a reply in response to the command to the electronic device and switching by the smart card the current state to a ready state when the received command is a card probing command;

receiving a command from the electronic device by the smart card in the ready state, determining the command received from the electronic device, returning by the smart card a confirmation message to the electronic device and switching by the smart card the current state to the active state when the received command is a conflict detection command, wherein the confirmation message comprises a unique identification UID of the smart card;

receiving a command from the electronic device by the smart card in the active state, determining the command received from the electronic device, returning by the smart card a reply in response to the command to the electronic device and keeping by the smart card the current state as the active state when the received command is a selection command, wherein the reply in response to the selection command comprises at least one of a waiting time, a baud rate, a history byte and a manufacturer code supported by the smart card.

7. A smart card, comprising:

a computer readable storage medium for storing a program; and a processor, wherein the processor is configured to execute the program to execute the following modules:

a sending module, configured to send a waiting time extension instruction to an electronic device when the smart card is in an electromagnetic field of the electronic device and in an active state, the waiting time extension instruction at least comprising a preset waiting duration;

a receiving module, configured to trigger a timer to start timing after receiving a reply returned by the electronic device in response to the waiting time extension instruction;

a timer, configured to start timing after being triggered by the receiving module, a timing duration being the preset waiting duration;

a control module, configured to determine whether the timer times out after detecting that smart card leaves the field, and keep a current state of the smart card as the active state when the timer does not time out, wherein the smart card is powered by a built-in power supply of the smart card when the smart card leaves the field, and further configured to determine whether the timer times out after detecting that smart card re-enters the field, and keep the current state of the smart card as the active state when the timer does not time out.

8. The smart card according to claim 7, wherein the control module is configured to detect that the smart card leaves the field by:

detecting by the control module that a rectified voltage of the smart card changes from a high level to a low level.

9. The smart card according to claim 7, wherein the control module is configured to detect that the smart card re-enters the field by:

detecting by the control module that the rectified voltage of the smart card changes from a low level to a high level.

10. The smart card according to claim 7, wherein the receiving module is further configured to receive a leaving-field instruction input by a user before the sending module sends the waiting time extension instruction to the electronic device.

11. The smart card according to claim 7, wherein the smart card further comprises a coil;

the receiving module is further configured to receive an operation command sent by the electronic device before the sending module sends the waiting time extension instruction to the electronic device, the operation command comprising at least a charging command;

the coil is configured to acquire energy from the electromagnetic field of the electronic device to charge the smart card after the control module detects that the smart card leaves the field and before the control module detects that the smart card re-enters the field.

12. The smart card according to claim 7, wherein the smart card further comprises a first determining module, a second determining module, a third determining module and a fourth determining module;

the first determining module is configured to determine whether the smart card enters the field in a leaving-field state, and send a determination result to the control module;

the control module is configured to control the smart card to switch the current state to an idle state when the determination result of the first determining module is yes;

the receiving module is configured to receive a command sent by the electronic device;

the second determining module is configured to determine a command received by the smart card from the electronic device in the idle state, and notify the control module when the received command is a card probing command;

the control module is further configured to return a reply in response to the card probing command to the electronic device through the sending module and control the smart card to switch the current state to the ready state when the second determining module determines that the command received by the smart card in the idle state is the card probing command;

the third determining module is configured to determine a command received by the smart card from the electronic device in the ready state, and notify the control module when the received command is a conflict detection command;

the control module is further configured to return the confirmation message to the electronic device through the sending module and control the smart card to switch the current state to the active state when the third determining module determines that the command received by the smart card in the ready state is the conflict detection command, wherein the confirmation message comprises a unique identification UID of the smart card;

the fourth determining module is configured to determine a command received by the smart card from the electronic device in the active state, and notify the control module when the received command is a selection command;

the control module is further configured to return a reply in response to the selection command to the electronic device through the sending module and control the smart card to keep the current state as the active state when the fourth determining module determines that the command received by the smart card in the active state is the selection command, wherein the reply in response to the selection command comprises at least one of a waiting time, a baud rate, a history byte and a manufacturer code supported by the smart card.

13. A smart card, comprising:

one or more processors;

a memory; and one or more programs;

wherein the one or more programs are stored in the memory, and when executed by the one or more processors, perform following operations:

sending a waiting time extension instruction to an electronic device when monitoring that the smart card is in an electromagnetic field of the electronic device and in an active state, the waiting time extension instruction comprising at least a preset waiting duration;

starting a timer after the smart card receives a reply returned by the electronic device in response to the waiting time extension instruction, a timing duration of the timer being the preset waiting duration;

detecting that the smart card leaves the field, determining whether the timer times out, and keeping a current state of the smart card as the active state when the timer does not time out, wherein the smart card is powered by a built-in power supply of the smart card when the smart card leaves the field; and detecting that the smart card re-enters the field, determining whether the timer times out, and keeping the current state of the smart card as the active state when the timer does not time out.

14. The smart card according to claim 13, wherein detecting that the smart card leaves the field comprises:

detecting that a rectified voltage of the smart card changes from a high level to a low level.

15. The smart card according to claim 13, wherein detecting that the smart card re-enters the field comprises:

detecting that the rectified voltage of the smart card changes from a low level to a high level.

16. The smart card according to claim 13, wherein before sending the waiting time extension instruction to the electronic device, when the one or more programs are executed by the one or more processors, a following operation is performed:

receiving a leaving-field instruction input by a user.

17. The smart card according to claim 13, wherein before sending the waiting time extension instruction to the electronic device, when the one or more programs are executed by the one or more processors, a following operation is performed:

receiving an operation command sent by the electronic device, the operation command at least comprising a charging command.

18. The smart card according to claim 13, wherein after detecting that the smart card leaves the field, and before detecting that the smart card re-enters the field, when the one or more programs are executed by the one or more processors, a following operation is performed:

acquiring energy from the electromagnetic field of the electronic device by a coil of the smart card, to charge the smart card.

19. The smart card according to claim 13, wherein before the smart card is in the electromagnetic field of the electronic device and in the active state, when the one or more programs are executed by the one or more processors, following operations are performed:

determining whether the current state is detected in a leaving-field state when entering the field, and switching the current state to an idle state by the smart card in case of the current state is detected in the leaving-field state when entering the field;

receiving a command from the electronic device in the idle state, determining the command received from the electronic device, returning a reply in response to the command to the electronic device and switching the current state to a ready state when the received command is a card probing command;

receiving a command from the electronic device in the ready state, determining the command received from the electronic device, returning a confirmation message to the electronic device and switching the current state to the active state when the received command is a conflict detection command, wherein the confirmation message comprises a unique identification UID of the smart card;

receiving a command from the electronic device in the active state, determining the command received from the electronic device, returning a reply in response to the command to the electronic device and keeping the current state as the active state when the received command is a selection command, wherein the reply in response to the selection command comprises at least one of a waiting time, a baud rate, a history byte and a manufacturer code supported by the smart card.

* * * * *